(12) United States Patent
Ogi et al.

(10) Patent No.: US 6,338,327 B1
(45) Date of Patent: Jan. 15, 2002

(54) COMBUSTION CHAMBER STRUCTURE OF IN-CYLINDER DIRECT FUEL INJECTION ENGINE

(75) Inventors: Taiichiro Ogi; Koji Morikawa, both of Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/527,172

(22) Filed: Mar. 16, 2000

(30) Foreign Application Priority Data

Mar. 29, 1999 (JP) .......................... 11-086481
Aug. 30, 1999 (JP) .......................... 11-243935

(51) Int. Cl.⁷ .............................................. F02B 23/10
(52) U.S. Cl. .................. 123/257; 123/276; 123/303; 123/73 C
(58) Field of Search ................ 123/257, 276, 123/279, 303, 73 C (56) References Cited

U.S. PATENT DOCUMENTS 5,020,485 A * 6/1991 Watanabe ................. 123/73 C
5,209,200 A * 5/1993 Ahern et al. .............. 123/276
6,158,409 A * 12/2000 Gillespie et al. .......... 123/276

FOREIGN PATENT DOCUMENTS

DE    DL-145 122 A  * 11/1980 ................. 123/276
GB    2 039 614 A   * 8/1980  ................. 123/276

* cited by examiner

Primary Examiner—Andrew M. Dolinar
(74) Attorney, Agent, or Firm—Martin A. Farber (57) ABSTRACT

In an in-cylinder fuel injection two cycle engine, a combustion chamber dome and a piston cavity are provided in an offset position from a cylinder bore center axis to an exhaust port side, respectively. A spark plug is mounted in a cylinder head such that its electrode is positioned in vicinity of the cylinder bore center axis in the dome. Further, a fuel injector is mounted in the cylinder head such that its injection nozzle is positioned around an outer periphery edge of the dome on the exhaust port side and fuel is injected from the injection nozzle toward the piston cavity. The piston cavity is shaped into a concavely spherical surface so as to direct injected fuel toward the electrode of the spark plug, thereby locally rich, combustible mixture being formed around the spark plug.

6 Claims, 7 Drawing Sheets

10: ENGINE
11: CYLINDER
11a: BOOSTER PORT
11b: SCAVENGING PORT
11c: EXHAUST PORT
13: PISTON
13a: PISTON CAVITY
13b: SPHERICAL SURFACE
14: CYLINDER HEAD
14b: DOME
15: SPARK PLUG
16: ELECTRODE
18: FUEL INJECTOR

FIG. 1

10: ENGINE
11: CYLINDER
11a: BOOSTER PORT
11b: SCAVENGING PORT
11c: EXHAUST PORT
13: PISTON
13a: PISTON CAVITY
13b: SPHERICAL SURFACE
14: CYLINDER HEAD
14b: DOME
15: SPARK PLUG
16: ELECTRODE
18: FUEL INJECTOR

COMBUSTION CHAMBER STRUCTURE OF IN-CYLINDER DIRECT FUEL INJECTION ENGINE

BACKGROUND OF THE INVENTION

1. Field of the Invention

The present invention relates to a structure of a combustion chamber for an in-cylinder fuel injection engine in which fuel is injected directly into the cylinder.

2. Background art

Generally, since the stratified charge combustion strategy provides a readily ignitable rich air-fuel mixture in the vicinity of the spark plug with the overall air-fuel ratio retained in the lean condition, the engine employing the stratified charge combustion strategy has an excellent fuel economy performance.

Figure 8:
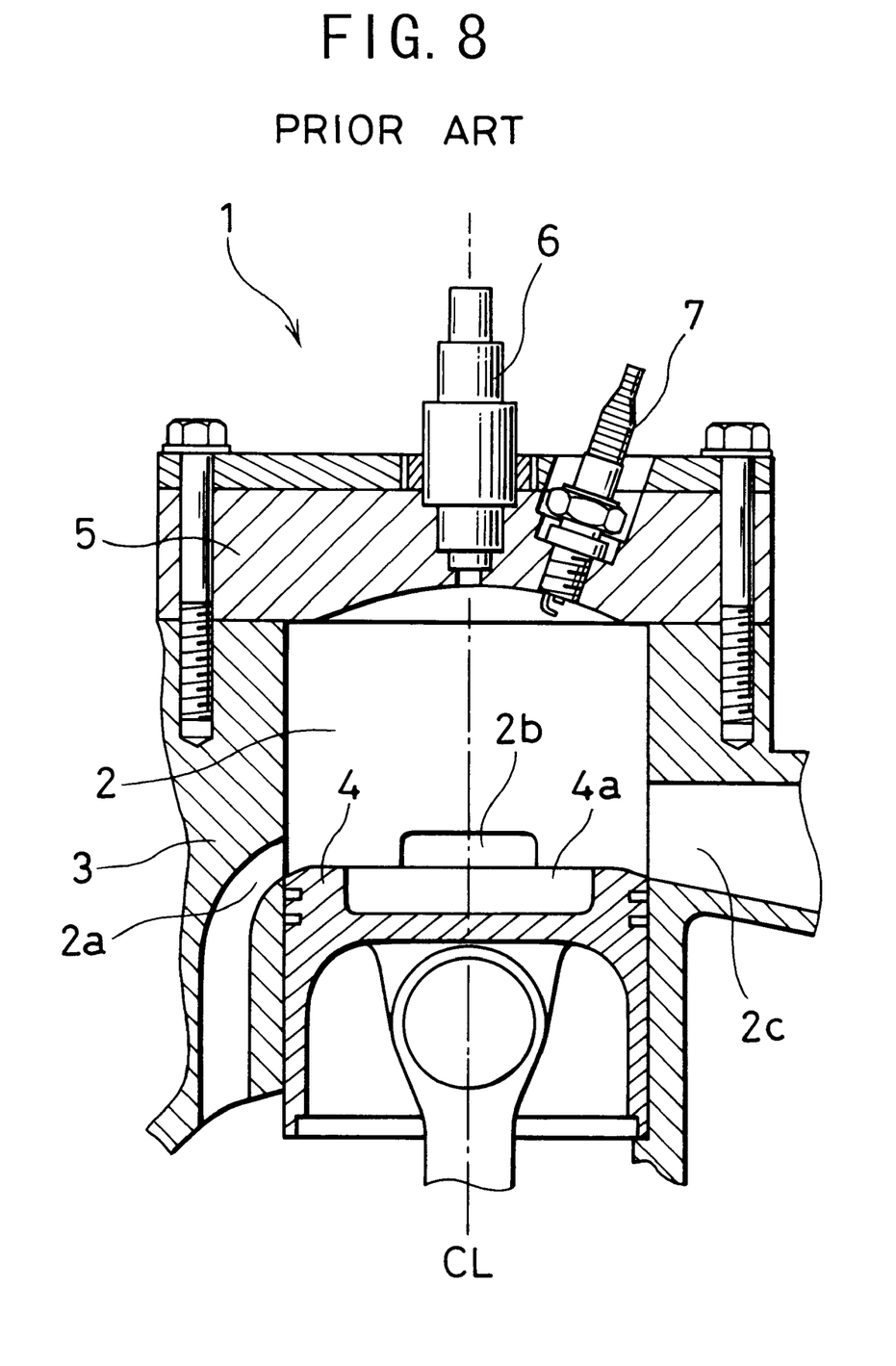
FIG. 8 is a side cross sectional view of an in-cylinder direct fuel injection 2-cycle engine according to a prior art.

An engine 1 shown in FIG. 8 is an example of an in-cylinder fuel injection two cycle engine intended to realize the stratified charge combustion according to the prior art. The engine 1 comprises a cylinder block 3 having a cylinder 2, a piston 4 reciprocating in the cylinder 2 and a cylinder head 5. A combustion chamber is formed by the cylinder 1, the top surface of the piston 4 and the cylinder head 5.

A cavity 4a is formed on the top surface of the piston 4, a fuel injector 6 is disposed approximately coaxially with the center line CL of the cylinder bore, and a spark plug 7 is disposed slightly diagonally in the vicinity of the fuel injector 6.

There are provided a booster port 2a, a scavenging port 2b and an exhaust port 2c on the wall surface of the cylinder 2 and these ports are opened and closed respectively by the reciprocating motion of the piston 4. The booster port 2a and the scavenging port 2b are ports for introducing a fresh air including lubrication oil into the cylinder 2. The exhaust port 2c is a passage for discharging exhaust gas therethrough and it is provided opposite to the booster port 2a.

In this type of the combustion chamber, the spark plug 7 ignites the rear end of the fuel spray in a first stage diffusion. The fuel spray in the first stage diffusion is a fuel at a stage of diffusing and not reaching the top surface of the rising piston 4.

As described before, according to this prior art, the fuel injector 6 is close to the spark plug 7, so that the rear end of the sprayed fuel is ignited by the spark plug 7 before the sprayed fuel collides with the top surface of the rising piston 4. This disposition of the spark plug 7 adjacent to the fuel injector 6 incurs a temperature-rise of the fuel injector 6 itself, this causing the malfunction of the fuel injector 6, an increase of carbon deposits and the like.

Further, the ignition of the fuel spray in the first stage diffusion tends to provide an inadequate atomization in the sprayed fuel and this inadequate atomization causes a wetting in the spark plug 7, this often leading to a spark plug fouling. Further, supposing a case of the ignition of the fuel spray in a second stage diffusion, that is, a state of the fuel spray after a collision against the piston 4, since the flow of scavenging acts as carrying the fuel spray away from the spark plug 7, this strategy of combustion makes it difficult to realize the stratified charge combustion.

SUMMARY OF THE INVENTION

It is an object of the present invention to provide a combustion chamber structure of an in-cylinder direct fuel injection engine capable of realizing the stratified charge combustion and it is a further object of the present invention to provide an internal combustion engine free from serious malfunctions like misfires.

DETAILED DESCRIPTION OF THE INVENTION

Figure 1:
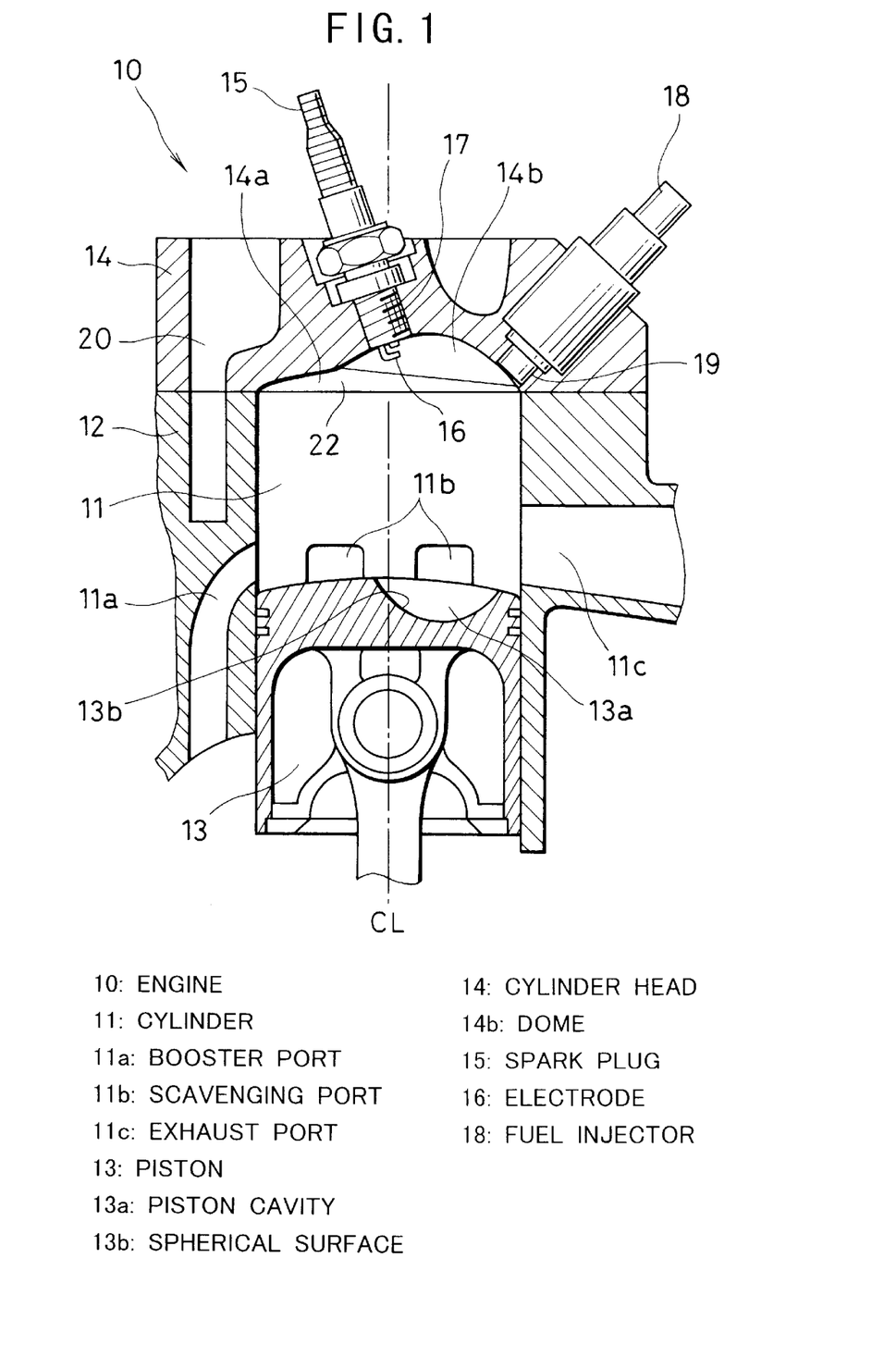
FIG. 1 is a side cross sectional view of an in-cylinder direct fuel injection 2-cycle engine according to a first embodiment of the present invention.

Referring now to FIG. 1, reference numeral 10 denotes an in-cylinder direct fuel injection 2-cycle engine introducing a reverse scavenging flow method. The engine 10 comprises a cylinder block 12 having a cylinder 11, a piston 13 reciprocating in the cylinder 11 and a cylinder head 14 which forms a combustion chamber together with the cylinder 11 and the top of the piston 13.

Figure 2:
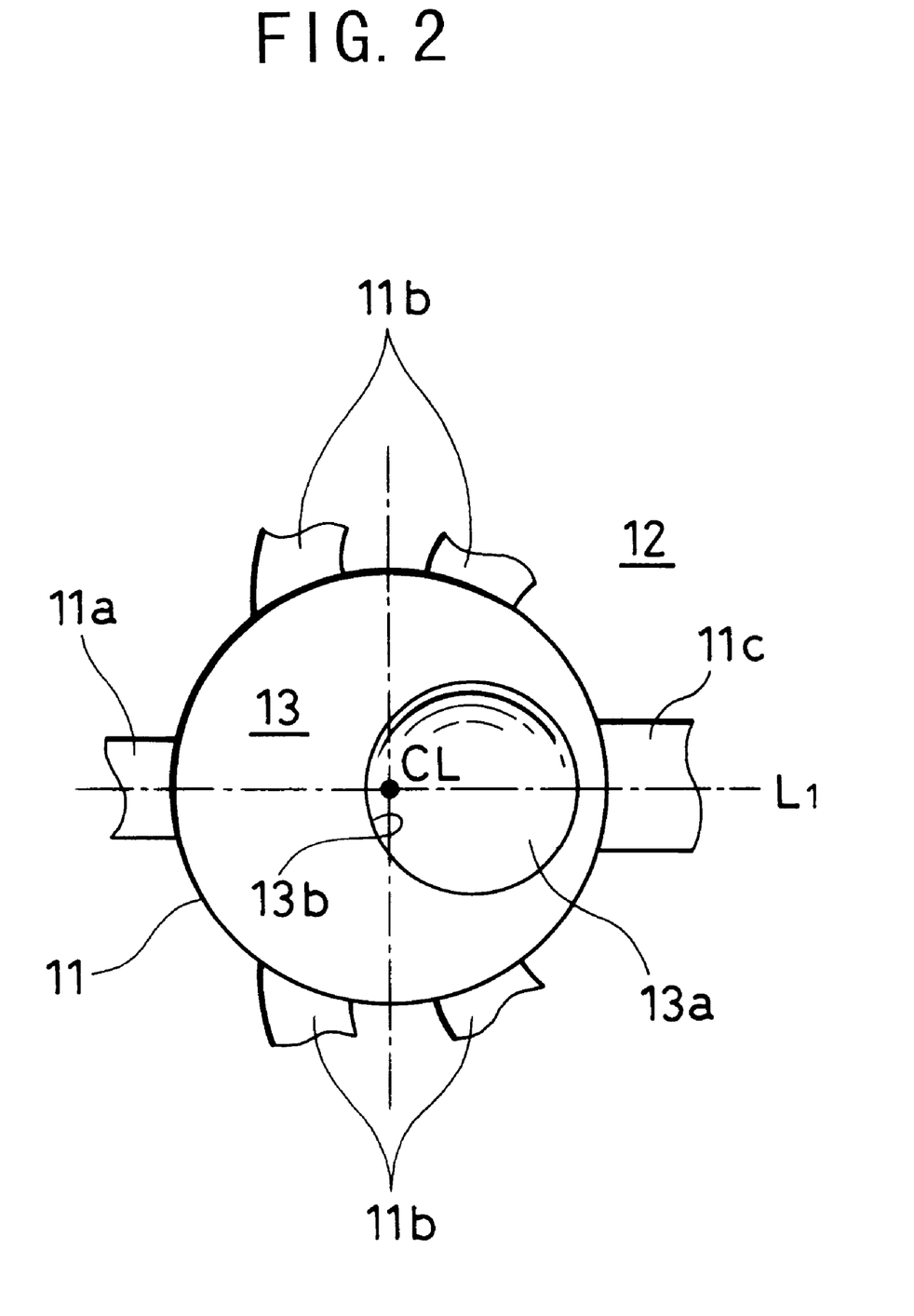
FIG. 2 is a partially top view of the engine shown in FIG. 1.

There are provided a booster port 11a, a plurality of scavenging ports 11b and an exhaust port 11c, which open and close by the reciprocating motion of the piston 13, in the wall of the cylinder 11. Further, the exhaust port 11c and the booster port 11a are disposed in diametrically opposed locations of the cylinder. The exhaust port 11c is located slightly higher than the booster port 11a. Further, as shown in FIG. 2, the scavenging ports 11b are arranged in a bilaterally symmetrical manner with respect to an axis L1 connecting the booster port 11a with the exhaust port 11c. In this case, the booster port 11a is one of scavenging ports and acts as promoting an inverse tumble flow (see FIG. 3a) of the fresh air in the cylinder 11.

Further, the booster port 11a is located at approximately the same level as the scavenging ports 11b and these ports 11a, 11b communicate with a crankcase (not shown) formed in the lower part of the cylinder block 12. Also, an intake port (not shown) communicates with the crankcase to introduce the fresh air including lubrication oil into the crankcase. The fresh air introduced into the crankcase is fed to the combustion chamber 22 through the booster port 11a and scavenging ports 11b.

As illustrated in FIG. 1, the top of the piston 13 is shaped convexly and further a concave piston cavity 13a is formed with a spherical wall surface 13b on a part of that convex surface. The piston cavity 13a is shaped round when viewed from top. The center of the piston cavity 13a is located approximately on the axis L1 when viewed from top and is slightly offset on the exhaust port 11c side with respect to a cylinder bore center line CL.

The cylinder head 14 is mounted on the cylinder block 12 and secured thereto by a plurality of bolts (not shown).

On the back surface of the cylinder head 14, a squish area 14a is formed along the top surface of the piston 13 and a combustion chamber dome 14b having a spherical surface is provided at a position opposite to the piston cavity 13a.

The center of the dome 14b approximately coincides with the center axis of the piston cavity 13a, when viewed from top. Further, the diameter of the edge circle of the dome 14b is designed so as to be slightly larger than that of the edge circle of the piston cavity 13a.

Further, a spark plug bore 17 is provided in the cylinder head 14 such that an electrode 16 of a spark plug 15 is positioned on the cylinder bore center CL. Further, a fuel injector bore 19 for mounting a fuel injector 18 is provided at the outer periphery edge of the dome 14b on the exhaust port side 11c so as to obtain a maximal distance between the spark plug 15 and the fuel injector 18 in the dome 14b. That is, an injection nozzle of the fuel injector 18 is positioned approximately at a point of intersection of the outer periphery edge of the dome 14b and the axis L1 connecting the center of the booster port 11a with the center of the exhaust port 11c.

Further, the fuel injector bore 19 is bored such that the fuel is injected toward the booster port 11a. On an actual fuel injection, since the fuel is injected at the latter period of the compression stroke, the fuel is sprayed along the spherical wall surface 13b of the piston cavity 13a.

The spark plug 15 is threaded into the spark plug bore 17 and the fuel injector 18 is mounted onto the fuel injector bore 19. The fuel injector 18 is controlled by a control section (not shown) so as to inject fuel into the combustion chamber based on the fuel injection amount and the fuel injection time which are optimally determined according to engine loads and engine speeds. Further, a plurality of coolant passages 20 are provided in the cylinder head 14 so as to circulate therethrough for the purpose of cooling the cylinder wall 11 and the combustion chamber.

In thus constituted engine 10, the fresh air is compressed by the squish area 14a, the dome 14b, the cylinder 11 and the piston cavity 13a of the rising piston 13 and then the fuel is injected towards the compressed fresh air. The sprayed fuel collides against the wall surface 13b of the piston cavity 13a, it goes upward along the wall surface 13b and forms a locally combustible mixture in the combustion chamber. When the spark plug 15 ignites thus formed combustible mixture, the combustion expands to overall mixture layers, the stratified charge combustion being accomplished.

In operation of thus constituted engine 10, when the piston 13 goes down from the top dead center toward the bottom dead center, first the top of the descending piston 13 opens the exhaust port 11a to discharge exhaust gas. Next, the piston 13 opens the booster port 11a and the scavenging port 11b which are located slightly below the exhaust port 11c. At this moment, the fresh air compressed within the crankcase is sent into the cylinder 11 through the booster port 11a and the scavenging port 11b to fill the cylinder 11 while it squeezes the residual exhaust gas out of the cylinder 11 through the exhaust port 11c.

Figure 3A:
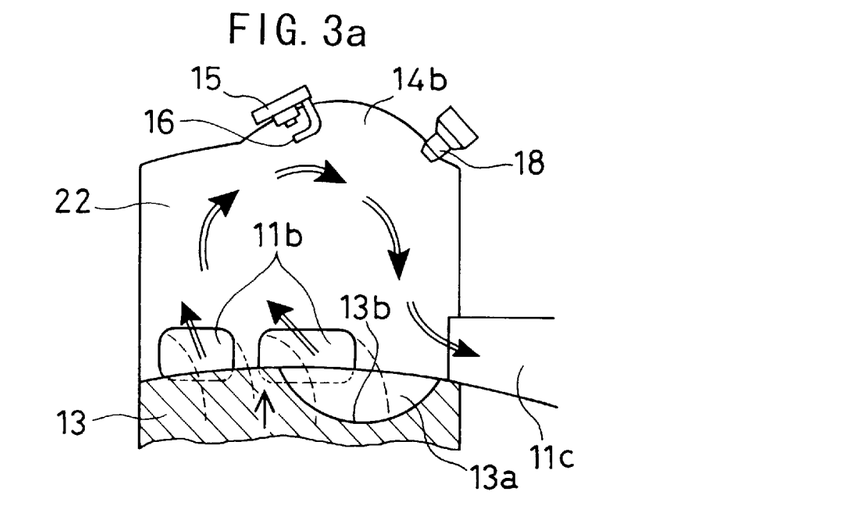
FIG. 3a is an explanatory view showing a flow of scavenging air when scavenging ports are opened.

This scavenging operation continues due to the inertia force of the incoming fresh air until the booster port 11a and the scavenging port 11b are closed by the top surface of the rising piston 13. When the piston 13 closes the exhaust port 11c, a reverse tumble flow of the fresh air is generated in the cylinder 11 (FIG. 3a).

Figure 3B:
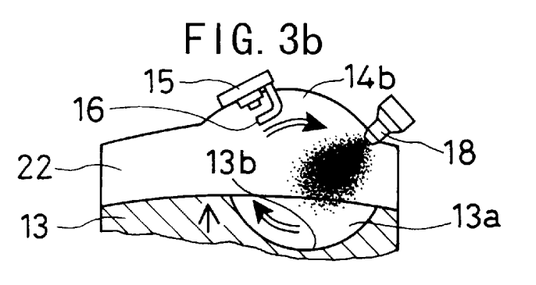
FIG. 3b is an explanatory view showing a state of a fuel injected from a fuel injector toward a piston cavity when a piston comes near the top dead center.
Figure 3C:
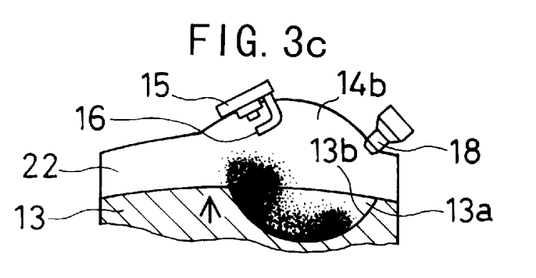
FIG. 3c is an explanatory view showing a state of a fuel going upward while being mixed with the fresh air.
Figure 3D:
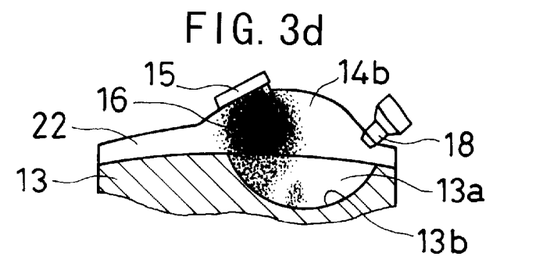
FIG. 3d is an explanatory view showing a state of a fuel stratified around a spark plug.

Further, when the piston 13 continues to rise toward the top dead center after the respective ports are closed, the fuel is optimized in the fuel injection amount and the fuel injection time and is injected toward the piston cavity 13a of the rising piston 13 (FIG. 3b). The sprayed fuel collides with the piston cavity 13a, travels upward along the surface configuration of the piston cavity 13a while it is mixed with the reverse tumble flow of the fresh air (FIG. 3c), and reaches immediately beneath the electrode 16 of the spark plug 15 to form a locally rich (stratified) and combustible mixture in the vicinity of the spark plug 15 (FIG. 3d). At this moment, the skirt of the piston 13 starts to open the intake port to introduce the fresh air.

The piston 13 further continues to rise and comes close to the top dead center. At an optimum timing before the piston 13 reaches the top dead center, the mixture is ignited by the electrode 16 of the spark plug 15. At this moment, since the rich, combustible mixture is formed around the electrode 16, the ignitablity is enhanced, thereby a good stratified charge combustion can be secured.

Further, when the combustible mixture is ignited, since the electrode 16 is positioned approximately on the cylinder bore center line CL, the combustion speed of the combustible mixture can be increased and as a result the combustion time can be reduced. Further, since the spark plug 15 is located as far from the fuel injector 18 as possible in the dome 14b, the fuel injector 18 can be less affected by heat from the spark plug 15.

When thus ignited mixture is burned in the combustion chamber 22, the high pressure gas generated by the combustion pushes the piston 13 downward, thereby the aforesaid cycle is repeated. The movement of the piston 13 is transmitted to a crank shaft (not shown) from which the rotational force is produced.

When the engine 10 is operated in a high load condition, the combustion strategy changes from the stratified charge combustion to the homogeneous charge combustion. Under this condition, since the fuel injector 18 is directed to the booster port 11a and the scavenging ports 11b, it is possible to inject fuel toward the upstream of the incoming fresh air and as a result it is possible to make more time for diffusion, evaporation and atomization of the injected fuel.

(Second Embodiment)

Next, an engine according to a second embodiment of the present invention will be described by reference to FIGS. 4 and 5.

According to the first embodiment, as described before, since the fuel injector 18 is arranged above the exhaust port 11c and extends in the same direction as the exhaust port 11c, the fuel injector 18 is easily influenced by heat.

To solve this problem, the second embodiment contemplates to reduce the influence of heat on the fuel injector 18 by arranging the fuel injector 18 as far apart from the exhaust port 11c as possible.

Figure 4:
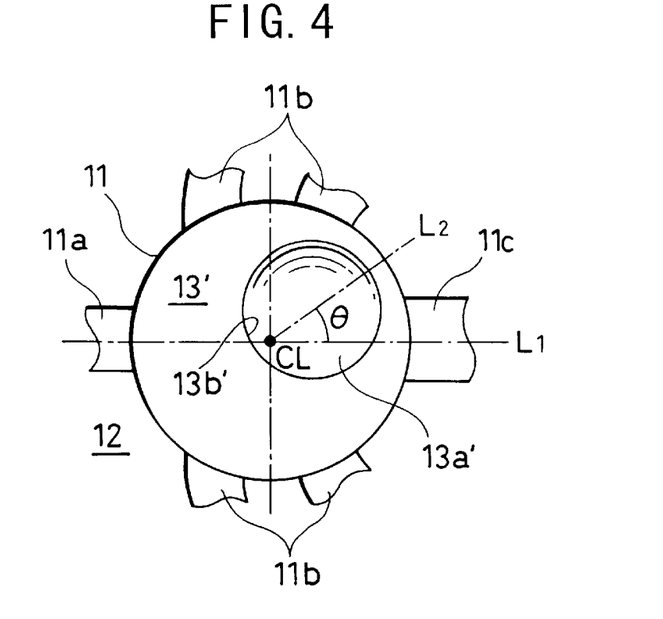
FIG. 4 is a partially top view of an in-cylinder direct fuel injection 2-cycle engine according to a second embodiment of the present invention.

Referring to FIG. 4, the piston 13' has a piston cavity 13a' in an offset position on the exhaust port 11c side with respect to the cylinder bore center CL and on the upper side with respect to the axis L1. Assuming an axis L2 connecting the cylinder bore center CL with a center of the piston cavity 13a', an angle θ contained by the axes L1 and L2 is within a range of 0<θ<90 degrees. The angle θ is more preferably 30 degrees or thereabout, in consideration of a degree of freedom in designing a cylinder head 14'. The piston cavity 13a' has the same configuration as the piston cavity 13a of the first embodiment.

Figure 5:
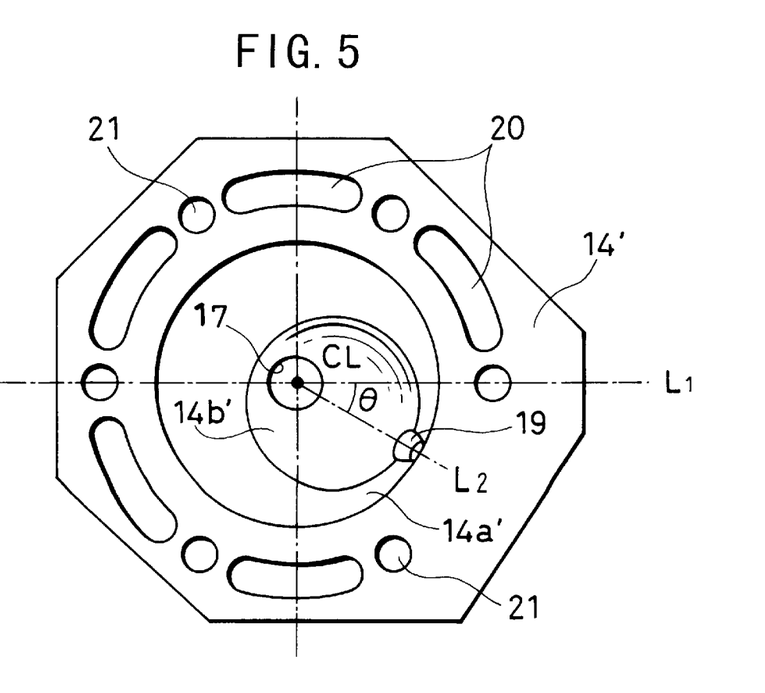
FIG. 5 is a bottom view of a cylinder head of the engine according to the second embodiment.

FIG. 5 shows an undersurface of the cylinder head 14' which is mounted on the cylinder block 12. In the drawing, there is provided a dome 14b' in a squish area 14a' of the cylinder head 14'. The dome 14b' is positioned opposite to the piston cavity 13a' and its center is located on the axis L2 meeting the axis L1 at an angle θ. Further, an injector bore 19 is provided approximately at a point of intersection of the axis L2 and the outer periphery edge of the dome 14b' such that the fuel spray from the fuel injector 18 threaded into the injector bore 19 is directed to the wall surface 13b' of the piston cavity 13a'.

Further, a spark plug bore 17 is provided in the dome 14b' in the vicinity of the cylinder bore center axis CL such that the electrode 16 of the spark plug 15 threaded into the spark plug bore 17 is positioned approximately on the cylinder bore center axis CL. In the drawing, reference numeral 20 denotes coolant passages and numeral 21 denotes bolt through holes for the tightening bolts 21 of the cylinder head 14'.

In the combustion chamber thus constituted, in the same manner as in the first embodiment, the reverse tumble flow is generated, the sprayed fuel travels upwards along the spherical wall surface 13b' toward the cylinder bore center axis CL and the rich, combustible mixture is formed in the vicinity of the spark plug 15. The mixture is ignited by the spark plug 15 to make the stratified charge combustion.

On the other hand, since the centers of the piston cavity 13a' and the dome 14b' are offset from the axis L1 respectively, the fuel injector 18 can be mounted as apart from the exhaust port 11c as possible. This can protect the fuel injector 18 from being heated by the exhaust port 11c.

Next, a third embodiment of the present invention will be described by reference to FIG. 6.

Generally, a plurality of scavenging ports 11b are formed on the wall surface of the cylinder block 12 in a bilaterally symmetrical manner with respect to the axis L1. When the actual scavenging flow is visualized, it is appreciated that the scavenging flow sometimes suddenly starts to rotate in a certain direction and sometimes suddenly starts to rotate in a reverse direction. Therefore, the symmetrical structure of the scavenging ports does not always provide a stable scavenging flow around the spark plug 15.

The third embodiment contemplates to form a stable scavenging flow in the vicinity of the spark plug 15.

Figure 6:
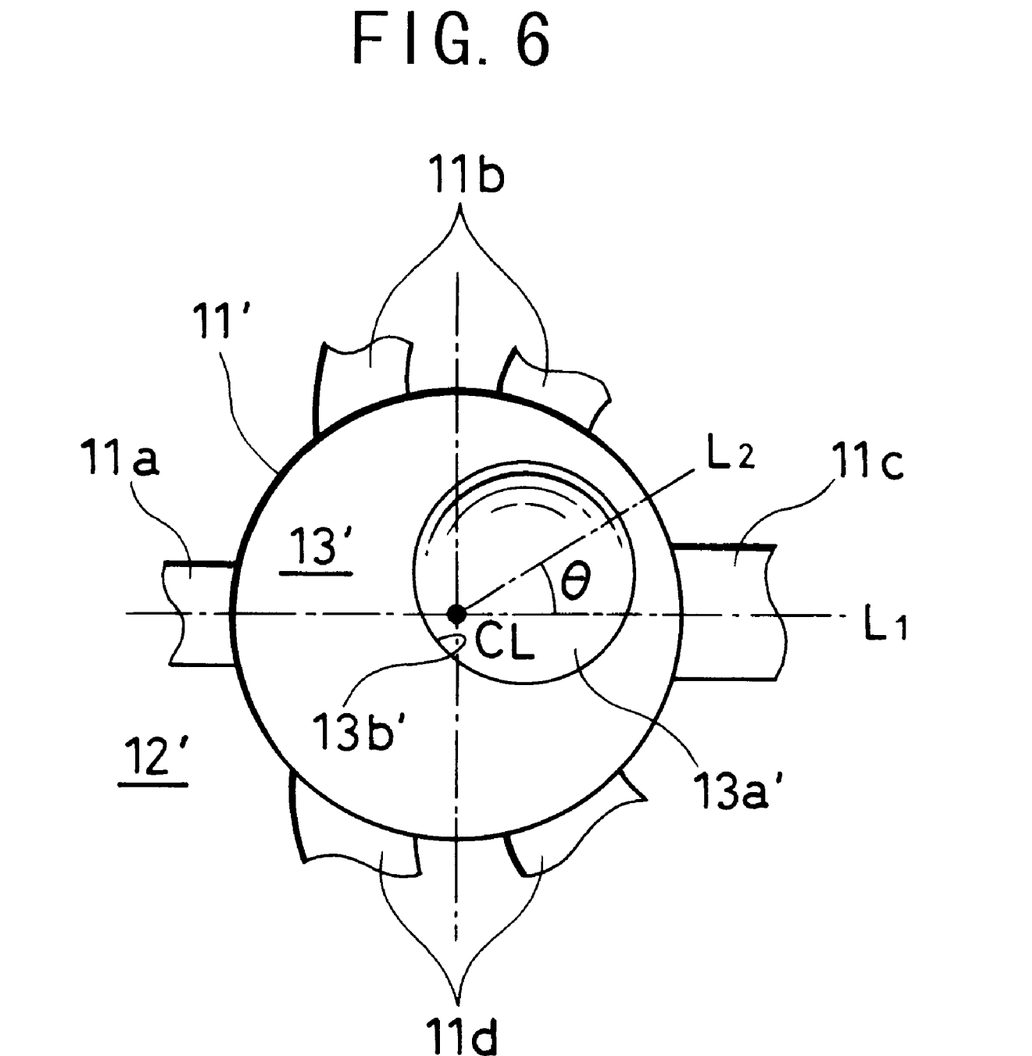
FIG. 6 is a partially top view of an in-cylinder direct fuel injection 2-cycle engine according to a third embodiment of the present invention.

Referring to FIG. 6, a plurality of scavenging ports 11b are disposed on the upper side of the axis L1 and a plurality of scavenging ports 11d are disposed on the lower side of the axis L1. The scavenging ports 11b are in an unsymmetrical relationship with the scavenging ports 11d. That is, the opening area of the scavenging ports 11d is larger (or smaller) than that of the scavenging ports 11b and the discharge direction of the scavenging ports 11d are different from that of the scavenging ports 11b.

Accordingly, the scavenging flow introduced into the cylinder 11 from thus unsymmetrically disposed scavenging ports, has a definite directivity and, as a result, when the fuel injector 18 injects fuel toward the scavenging flow, a steady combustible mixture can be formed securedly in the vicinity of the spark plug 15.

Figure 7:
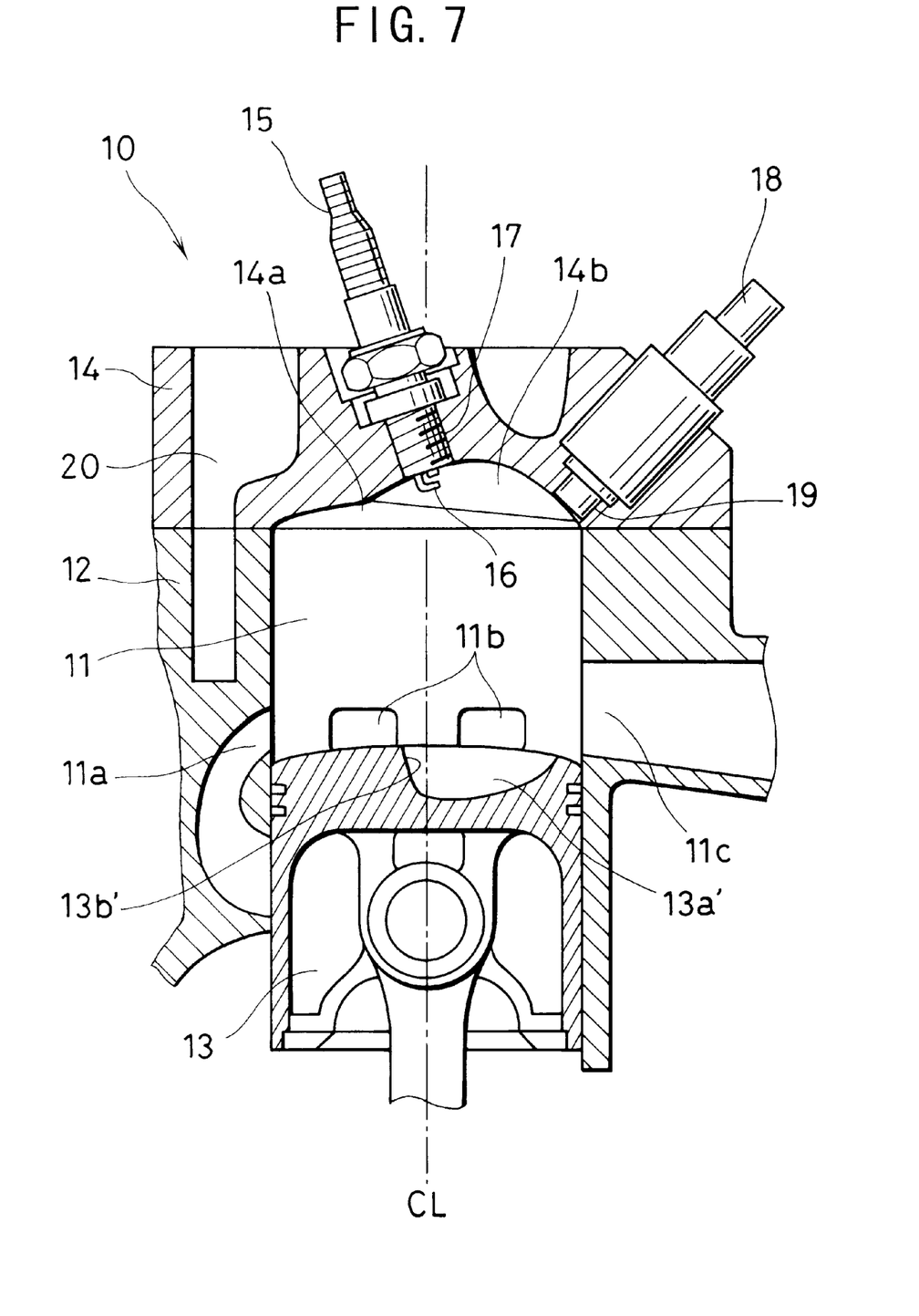
FIG. 7 is a side cross sectional view of an in-cylinder direct fuel injection 2-cycle engine according to a fourth embodiment of the present invention.

Next, a fourth embodiment of the present invention will be described by reference to FIG. 7.

In the first embodiment, the piston 13 has the piston cavity 13a shaped into a spherical surface 13b. On the other hand, in the fourth embodiment, the piston cavity 13a' is shaped partially into a spherical surface and partially into a steep cliff. That is, the piston cavity 13a' according to the fourth embodiment is shaped into a spherical surface from the outer periphery edge to the central part of the piston 13 and a steep cliff 13b' at the central part of the piston 13. The steep cliff 13b' has a more definite directivity toward the electrode 16 of the spark plug 15 than the spherical surface 13b of the first embodiment. That is, since the fuel spray is concentratedly guided by the steep cliff 13b' toward the electrode 16, a rich mixture can be more easily formed around the electrode 16. In other words, the magnitude of the stratification of mixture can be intensified.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. In-cylinder fuel injection engine having a cylinder, a piston movably disposed in said cylinder for reciprocal motion, a cylinder head secured over said cylinder and piston to form a combustion chamber, an exhaust port, a booster port disposed on an opposite side of said exhaust port with respect to a cylinder bore center axis to strengthen a scavenging flow of fresh air, a plurality of scavenging ports, a spark plug mounted in said cylinder head and a fuel injector mounted in said cylinder head to inject fuel into said cylinder, said engine comprising:

a piston cavity shaped into a concave spherical surface and disposed on a top surface of said piston such that a center of said piston cavity is located approximately on a first plane defined by a center of said exhaust port and said cylinder bore center axis and in an offset position on an exhaust port side;

a combustion chamber dome disposed opposite to said piston cavity at a back surface of said cylinder head;

an electrode of said spark plug positioned in a vicinity of said cylinder bore center axis; and an injection nozzle of said fuel injector positioned approximately at a point of intersection of said first plane and an outer periphery edge line of said dome, said point existing at a side of said exhaust port.

2. The engine according to claim 1, wherein said plurality of scavenging ports are arranged unsymmetrically with respect to said first plane.

3. The engine according to claim 1, wherein said piston cavity has a steep cliff surface partly formed on said concave spherical surface.

4. In-cylinder fuel injection engine having a cylinder, a piston movably disposed in said cylinder for reciprocal motion, a cylinder head secured over said cylinder and piston to form a combustion chamber, an exhaust port, a booster port disposed on an opposite side of said exhaust port with respect to a cylinder bore center axis to strengthen a scavenging flow of fresh air, a plurality of scavenging ports, a spark plug mounted in said cylinder head and a fuel injector mounted in said cylinder head to inject fuel into said cylinder, said engine comprising;

a piston cavity shaped into a concave spherical surface disposed on a top surface of said piston such that a center of said piston cavity is located on either side of a first plane defined by a center of said exhaust port and said cylinder bore center axis, a combustion chamber dome disposed opposite to said piston cavity at a back surface of said cylinder head, electrode of said spark plug positioned in a vicinity of said cylinder bore center axis, and an injection nozzle of said fuel injector positioned approximately at a point of intersection of a second plane, the latter defined by said cylinder bore center axis and said center of said piston cavity and an outer periphery edge line of said dome, said point existing at a side of said exhaust port.

5. The engine according to claim 4, wherein said plurality of scavenging ports are arranged unsymmetrically with respect to said first plane.

6. The engine according to claim 4, wherein said piston cavity has a steep cliff surface partly formed on said concave spherical surface.

* * * * *